July 23, 1957     A. B. NIXON     2,800,257
MEASURING AND DISPENSING DEVICE
Filed Aug. 2, 1954
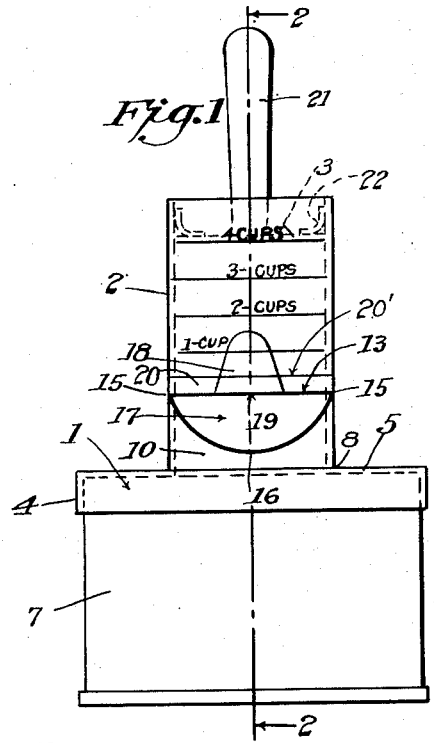
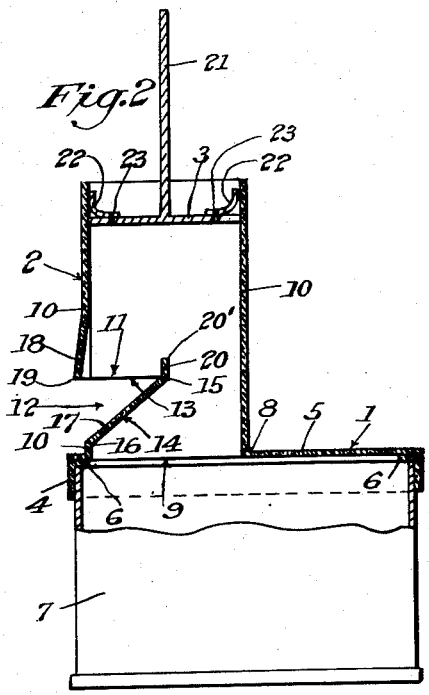
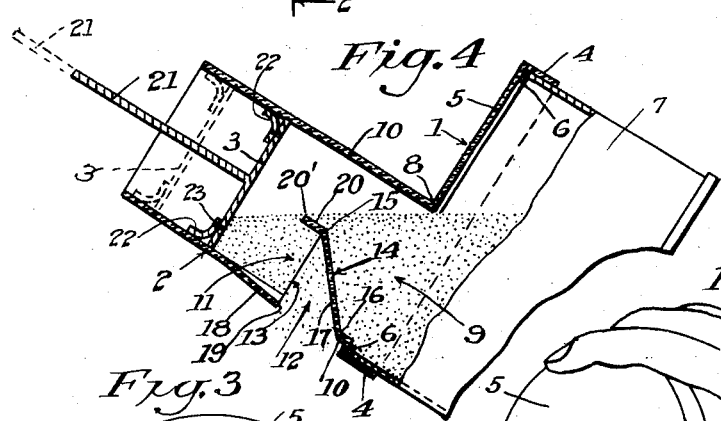
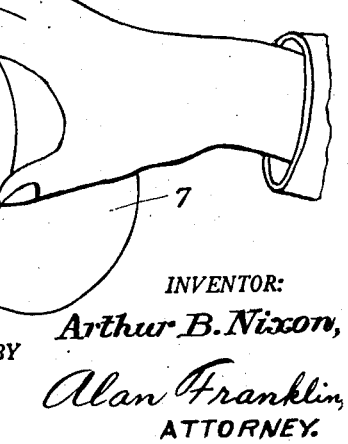
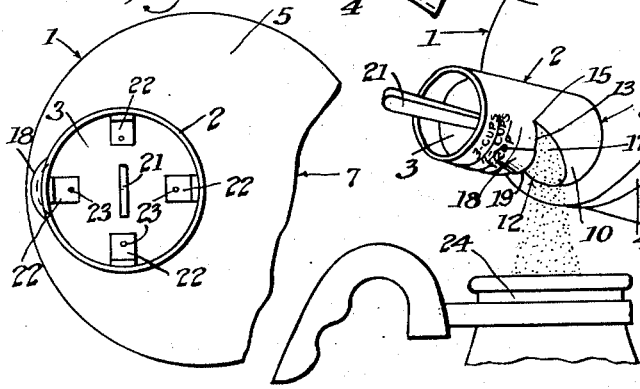
INVENTOR:
Arthur B. Nixon,
BY Alan Franklin,
ATTORNEY.

800,257
Patented July 23, 1957

United States Patent Office

2,800,257
MEASURING AND DISPENSING DEVICE
Arthur B. Nixon, Los Angeles, Calif.

Application August 2, 1954, Serial No. 447,213

4 Claims. (Cl. 222—454)

This invention relates to measuring and dispensing apparatus, and more particularly to a measuring and dispensing device for dry material, such as coffee and other dry materials.

The general object of the invention is to provide a device of the character stated, which may be easily attached to a conventional container after the cover thereof has been removed, to form a part of said container to keep the contents thereof sealed, when the device is not being used.

A more particular object is to provide a device including means for easily adjusting the measuring and sealing element to allow release of coffee or other dry material to the exact quantity desired.

My measuring and dispensing device is adapted to deliver identical volumes of material each time its material container is inverted, but my device can be made in different sizes to deliver any predetermined volume or amount of material. For example, the device can be constructed to invariably deliver a teaspoonful, or to invariably deliver a cupful of material. A tablespoonful would be particularly convenient for coffee; a teaspoonful for sugar, and a cupful for flour. Any other described size or capacity would be easily constructed and as easily used.

Other objects and advantages will appear hereinafter as this specification progresses.

The invention is illustrated in the annexed drawing, in which:

Fig. 1 is a front elevation of my invention shown applied to a commercial can of coffee.

Fig. 2 is a vertical longitudinal section of Fig. 1 taken on line 2—2 of Fig. 1.

Fig. 3 is a plan view of Fig. 1.

Fig. 4 is a sectional view like Fig. 2 of my invention, shown in an inclined position in the act of dispensing a measured amount of coffee from a conventional coffee container.

Fig. 5 is a perspective of my invention, shown held in an inclined position like Fig. 4 and in the act of dispensing a measured amount of coffee from a conventional coffee container into a coffee percolator.

Referring more particularly to the drawing, in which the same parts are designated by the same reference numerals in all of the figures, my invention includes a base cap 1, a tubular measuring and dispensing receptacle 2, upstanding from said cap 1, and an unapertured measuring and sealing disc 3 slidably fitted in said measuring and dispensing receptacle 2.

The cap 1 comprises a cylindrical rim 4 and an outer circular wall 5, said rim being formed at its outer edge with an internal annular flange 6 upon which rests and is secured thereto the outer edge portion of said outer circular wall 5. The rim 4 is preferably made of flexible plastic, such as "vinylite" to fit snugly over and against the upper edge portion of a container such as a conventional coffee container 7.

The inner end 8 of the measuring and dispensing receptacle 2 is formed integral with the edge of an opening 9 in the outer wall 5 of the base cap 1 of my measuring and dispensing receptacle 2, through which opening 9 said base cap 1 communicates with the inner end of said measuring and dispensing receptacle 2.

The lower portion of the cylindrical wall 10 of the measuring and dispensing receptacle 2 is provided with an outlet 11 formed by a notch 12 located below said measuring and sealing disc 3 in one side of said wall 10 and extending to a length of one-half of the circumference of said receptacle wall 10, the upper edge 13 of said notch extending directly straight transversely of said receptacle wall 10 and the lower edge of said notch extending downwardly at an incline from the inner ends 15 of upper edge 13 of the notch 12 to the lower arcuate outer end 16 of said notch at the forward side of the receptacle wall 10, and there being a lower inclined wall 17 forming a lower inclined side of the notch 12 and extending downwardly from the upper inner ends 15 of said notch to the outer lower arcuate end 16 of said lower side wall 17 of said notch, for the purpose hereinafter more fully described. The front side of the wall 10 of the measuring and dispensing receptacle 2 is formed with a spout 18 extending outwardly from said wall 10 and downwardly therefrom to the forward end 19 of the lower edge 13 of the notch 12 in the front side of the measuring and dispensing receptacle 2, for the purpose hereinafter more fully described. From the upper end of the inclined lower wall 17 of the outlet notch 12, a flange 20 extends substantially coaxially of the measuring and dispensing receptacle 2 and diametrically of said receptacle between the inner ends 15 of the upper edge 13 of outlet notch 12, from the upper edge 20′ of which flange 20 the amount of material dispensed from the receptacle 2 is measured in the manner hereinafter described.

On the wall 10 of the measuring and dispensing receptacle 2, are four transverse marks in superimposed spaced relation above the upper edge of the measuring flange 20, marked 1 Cup, 2 Cups, 3 Cups, and 4 Cups, respectively, for measuring the amount of material dispensed, in the manner hereinafter more fully described.

To the upper side of the measuring and sealing disc 3 is secured the lower end of a handle 21 which may be grasped by one's hand to move said disc up or down in the measuring and dispensing receptacle 2, to register with any one of the marks 1 Cup, 2 Cups, 3 Cups, or 4 Cups, respectively, to indicate the amount of material measured to be dispensed.

A plurality of flexible fiber friction strips 22 are secured, respectively, near their inner ends to the upper side of the measuring and sealing disc 3, at 23, and said friction strips are bent transversely outwardly into sliding and frictional engagement with the inner side of the cylindrical wall 10 of the measuring and dispensing receptacle 2 to hold the measuring and sealing disc 3 in any position to which it may be moved in said receptacle 2 for measuring and dispensing material in said receptacle.

The operation of my invention is as follows:

The cover or cap of a container, such as a conventional commercial container of coffee 7, is first removed from the top of said container. The base cap 1 of my measuring and dispensing device is then fitted over the open top of said container 7, with the inner side of the cap ring 4 fitted tightly over the upper end portion of said container after inward pressure is applied against the outer side of the upper wall 5 of said cap 1, as shown in Figs. 1, 2 and 4 of the drawing. The handle 21 of the measuring disc 3 is then grasped and said measuring disc is moved in the measuring and sealing receptacle 2 until said disc coincides with one of the measuring marks on the front of said receptacle, for example, the mark indicated "2 Cups," indicating amount of coffee to be measured and dispensed from said container 7 (see Fig. 4. The container 7 and my measuring and dispensing device are then suitably inclined, whereupon coffee drops from the container 7 into the measuring and dispensing receptacle 2 through the inlet open end 9 of said receptacle and the space between the inclined notch wall 17 and flange 20, and the opposite rear portion of the receptacle wall 10, against the measuring disc 3 between said disc and the measuring edge 20' of said measuring flange 20, whereby an amount of dry coffee for making two cups of coffee for drinking is measured in the receptacle 2 between the measuring disc 3 and the measuring edge 20' of the flange 20. My measuring and dispensing device and container 7 are then brought into dispensing position with the measuring and dispensing receptacle 2, inclined slightly upwardly and outwardly with relation to the horizontal as shown in Fig. 4 and 5, with the notch 12 directly above the upper end of a coffee percolator 24, in which position of my measuring and dispensing receptacle 2 the dry coffee drops from the space in said receptacle 2 between the measuring disc 3 and the measuring edge 20' of the measuring flange 20, through the dispensing outlet 11 and out of the notch 12 into the upper end of the percolator 24 for making two cups of coffee, the inclined notch wall 17 preventing any coffee from dropping from the notch 12 back into the receptacle 2, and the flange 20 being above the coffee in the lower part of said receptacle (Fig. 4), no coffee can rise from the lower part of said receptacle over the upper edge 20' of flange 20 and pass out of said receptacle through the outlet 11 and notch 12.

My measuring and dispensing device is preferably made of transparent plastic, so that the coffee or other material from the container 7 may be seen through the transparent walls of the device, while measuring the material in the device for dispensing the same therefrom.

I claim:

1. A device for measuring and dispensing material from a container, including a cap adapted to fit over the open end of a conventional container of suitable material, a measuring and dispensing receptacle in communication with and outstanding from said cap to receive material from said container through said cap, said receptacle being provided with a notch in one side thereof formed with an inclined wall closing the lower side of said notch, the upper side of said notch forming an outlet leading from said receptacle, an unapertured measuring disc closing the outer end of said measuring and dispensing receptacle, from which container material may be poured through said cap into said receptacle against said measuring disc, when said container and said receptacle are suitably inclined for measuring a quantity of material in said receptacle to be dispensed, which material, when so measured, may be dispensed from said receptacle through said outlet, when said receptacle and cap, and said container are held in a suitably inclined position to the horizontal.

2. A device for measuring and dispensing material as claimed in claim 1, in which a flange extends outwardly from the upper inner end of said inclined wall, at the inner end of said outlet, and across said receptacle, with the outer edge of said flange forming an inner measuring edge, between which edge and said measuring disc said material is measured in said receptacle for dispensing said measured material from said receptacle through said outlet.

3. A device for measuring and dispensing material as claimed in claim 1, in which said measuring disc is slidably mounted in said measuring and dispensing receptacle, to be moved in said receptacle to different positions with relation to said outlet, for measuring different quantities of material to be dispensed from said receptacle through said outlet.

4. A device as claimed in claim 1, in which said measuring disc is slidably mounted in said measuring and dispensing receptacle, to be moved in said receptacle to different positions with relation to said outlet, for measuring different quantities of material to be dispensed from said receptacle through said outlet, or for closing said outlet and the outer end of said receptacle to prevent discharge of material from said receptacle and said container.

References Cited in the file of this patent

UNITED STATES PATENTS

| | | |
|---|---|---|
| 372,263 | Hazelton | Oct. 25, 1887 |
| 1,337,440 | Clappison | Apr. 20, 1920 |
| 1,568,923 | Ruiz | Jan. 5, 1926 |
| 1,576,497 | Austin | Mar. 16, 1926 |
| 2,243,452 | Bickel et al. | May 27, 1941 |
| 2,487,825 | Olvis | Nov. 15, 1949 |
| 2,645,388 | Hester | July 14, 1953 |